United States Patent Office.

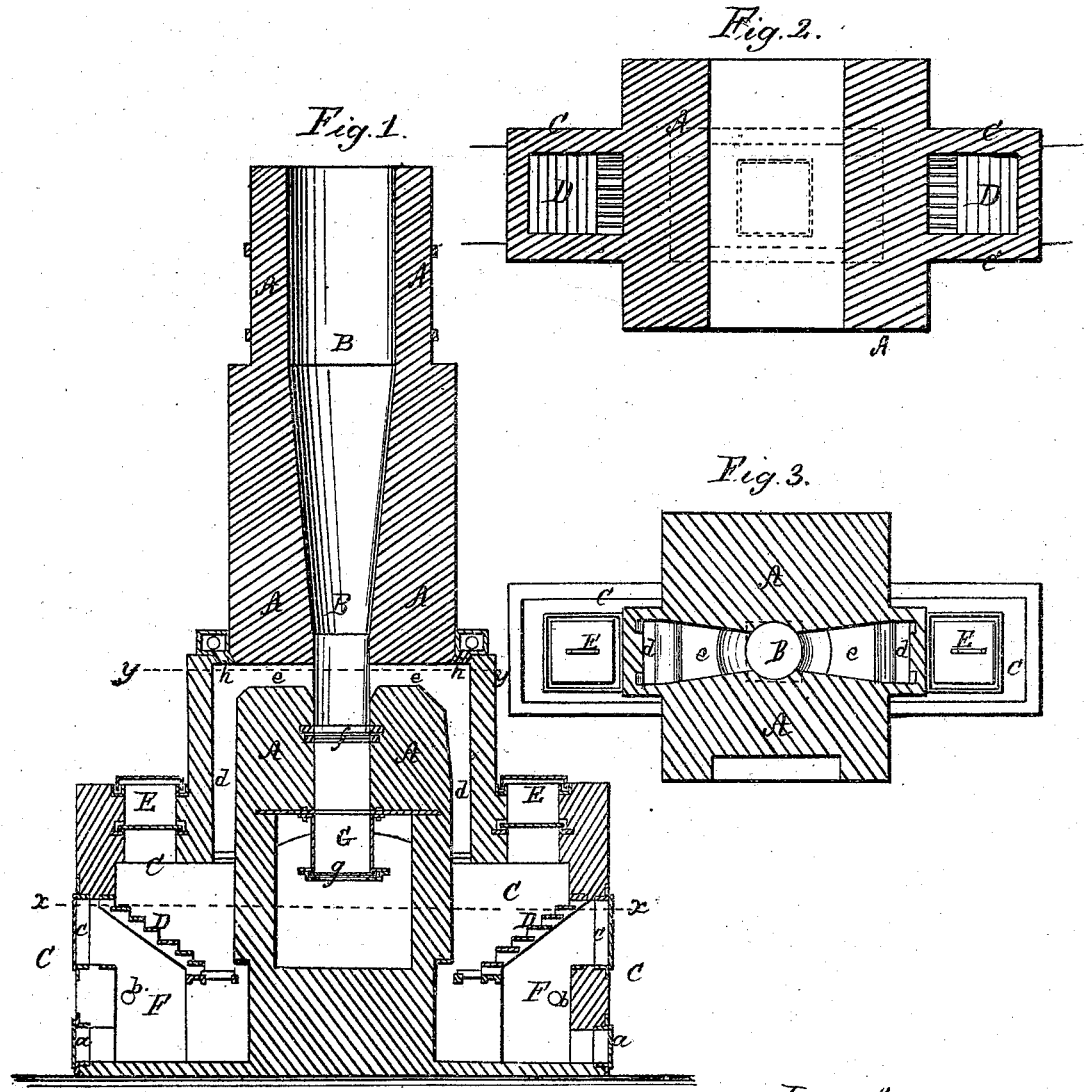

ALOIS THOMA, OF NEW YORK N. Y., ASSIGNOR TO HIMSELF, SAMUEL BROMBERG, AND ARTEMUS W. WILDER, OF THE SAME PLACE.

*Letters Patent No. 70,047, dated October 22, 1867.*

IMPROVED FURNACE FOR REDUCING IRON ORE.

The Schedule referred to in these Letters Patent and making part of the same.

TO ALL WHOM IT MAY CONCERN:

Be it known that I, ALOIS THOMA, of the city, county, and State of New York, have invented a new and improved Furnace for Reducing Iron Ore; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of my improved furnace for reducing ore.

Figure 2 is a horizontal sectional view of the same, the plane of section being indicated by the line $xx$, fig. 1.

Figure 3 is a horizontal sectional view of the same, the plane of section being indicated by the line $yy$, fig. 1.

Similar letters of reference indicate corresponding parts.

This invention relates to a new apparatus for discharging oxide from iron ore after the same has been roasted to reduce it in a red heat to metallic iron.

The invention consists in such an arrangement of the furnace in which the ore is to be reduced that the desired result can be obtained without bringing the ore in direct contact with the solid fuel, but only with the fuming gases arising from the same.

The invention is based upon the fact that oxide of iron is, when red hot, easily reduced to metallic iron by the application of carbonic oxide, carburetted hydrogen, or hydrogen gas.

A represents an upright cylindrical furnace, open at both ends, and supported by arches and pillars of suitable arrangement. The upper portion of the chamber B is broader than the lower, as shown in fig. 1. On each side of the cylinder, and below the lower end of the same, are one or more structures, C C, which are the furnaces for generating the gases. D D are the grates within these structures. E E are the doors above the grates for putting in the fuel. F F are the ash-pits, provided with doors $a\ a$, as shown. $b\ b$ are openings in the walls of the structures C, for creating the required draught. $c\ c$ are doors for cleaning the grates. $d$ and $e$ are the channels for conveying the gases produced by the combustion of the fuel from the grates D to the chamber B. The lower part of the chamber B may be made square, and a grate or perforated sliding-plate, $f$, arranged between the square and round portions. To the lower end of the tube A is secured a square cast-iron box, G, open on top, and closed by a sliding-bottom, $g$, as shown. At the junction of the channels $d$ and $e$ are entrances $h$ for atmospheric air, which is blown in with suitable power to be mixed with the gases.

The ore to be reduced is placed into the chamber B, and then the fire on the grate is started. The gases from the fire arise in the channels $d$, and are then mixed with as much air as is necessary to aid their combustion and to make a proper blast. The quantity of air entering at $h$ must be so little that only part of the gases is actually burnt. The unburnt portion of the gases should be heated to about 1,200° to 1,400° Fahrenheit. The same enter the chamber B at the end of the channels $e$, and reduce the ore, freeing it from its oxygen. It will take but very little time, at least in comparison with the ordinary process for reducing ore, to discharge the oxygen from the ore, and to thereby reduce the latter by my improved method. When the lower portion of the ore has been sufficiently reduced the grate $f$ is inserted through openings in the side of the furnace, and the plate $g$ can then be drawn out so as to discharge the lower reduced portion of the ore. The plate $g$ is again replaced, and the grate $f$ withdrawn to let the ore down again upon $g$, when the lower part will be again reduced.

By practice it has been ascertained that the best kind of bar iron is produced by this method from iron roasted and desulphurized by my improved process as described in another application filed herewith. The fuel may be of any suitable kind; coal of any description, wood, peat, or any other suitable material, will be sufficient.

The gas is not heated enough to bind phosphorus to the iron, which is done in ores containing phosphorus if the heat of the gases is too high. The phosphorus will be taken from the ore by the light-heated gas, and thus, in connection with my roasting and desulphurizing apparatus, a very pure iron will be produced with any kind of fuel from ordinary ore, as the same is to be found in the United States. The reduced iron is stored so as to be protected from oxidizing.

Having thus described my invention, what I claim as new, and desire to secure by Letters Patent, is—

1. Reducing iron ore by means of gases produced from fires, the fuel of which is not in contact with the ores, substantially as and for the purpose herein shown and described.

2. The arrangement of the structures A and C, connected by channels $d$ and $e$, and with air-blasts $h$, substantially as herein shown and described.

3. The arrangement in the lower part of the tube A of the sliding grate or plate $f$, and removable or sliding bottom $g$, all made as described.

ALOIS THOMA.

Witnesses:
WM. F. MCNAMARA,
ALEX. F. ROBERTS.